US011976609B2

(12) United States Patent
Kitazaki et al.

(10) Patent No.: US 11,976,609 B2
(45) Date of Patent: May 7, 2024

(54) STIRLING ENGINE

(71) Applicant: Yanmar Holdings Co., Ltd., Osaka (JP)

(72) Inventors: Masato Kitazaki, Osaka (JP); Toru Yoshizuka, Osaka (JP); Osamu Sakamoto, Maibara (JP); Taeko Tahara, Maibara (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 17/982,196

(22) Filed: Nov. 7, 2022

(65) Prior Publication Data

US 2023/0142663 A1 May 11, 2023

(30) Foreign Application Priority Data

Nov. 9, 2021 (JP) ................................ 2021-182824

(51) Int. Cl.

*F02G 1/055* (2006.01)
*F02G 1/057* (2006.01)
*F02N 11/08* (2006.01)

(52) U.S. Cl.

CPC ............ *F02G 1/055* (2013.01); *F02G 1/057* (2013.01); *F02N 11/08* (2013.01)

(58) Field of Classification Search

CPC .......... F02G 1/055; F02G 1/057; F02G 1/044; F02N 11/08

USPC .................................................. 60/517–526

See application file for complete search history.

(56) References Cited

U.S. PATENT DOCUMENTS

| | | | | |
|---|---|---|---|---|
| 4,569,539 A * | 2/1986 | Creedon | G21B 1/25 | 285/379 |
| 4,765,138 A * | 8/1988 | Corey | F02G 1/055 | 60/517 |
| 4,881,372 A * | 11/1989 | Naito | F02G 1/055 | 60/641.14 |
| 5,325,671 A * | 7/1994 | Boehling | F01C 1/3442 | 60/519 |
| 5,343,704 A * | 9/1994 | Kanzaki | F01B 3/02 | 60/517 |
| 6,460,347 B1 * | 10/2002 | Fujiyama | F25B 9/14 | 60/520 |

FOREIGN PATENT DOCUMENTS

| | | |
|---|---|---|
| JP | H07-259646 A | 10/1995 |
| JP | 10-213012 A | 8/1998 |
| JP | 5533713 B2 | 6/2014 |

* cited by examiner

*Primary Examiner* — Hoang M Nguyen
(74) *Attorney, Agent, or Firm* — NORTON ROSE FULBRIGHT US LLP

(57) ABSTRACT

A Stirling engine includes an engine main body including at least an engine unit and a cooler heat exchanger, and a heater structure including at least a heater heat exchanger. The engine main body and the heater structure have separate structures, and the engine main body and the heater structure are connected via a coupling pipe portion.

20 Claims, 11 Drawing Sheets

STIRLING ENGINE

CROSS-REFERENCE TO RELATED APPLICATIONS

This application claims priority under 35 U.S.C. § 119 to JP Application No. 2021-182824 filed Nov. 9, 2021, the entire contents of which are hereby incorporated by reference.

TECHNICAL FIELD

The present invention relates to a Stirling engine.

BACKGROUND ART

A Stirling engine can recover motive power from a wide variety of high temperature heat sources. In recent years, the Stirling engine has attracted attention as an exhaust heat recovery/power generation technique from existing high-temperature exhaust heat (from waste incineration plants, factory furnaces, and the like). In the Stirling engine, spaces of a heater heat exchanger, a regenerator, and a cooler heat exchanger are connected in this order to a high-temperature space (expansion space) above the piston. The Stirling engine generates motive power by inserting a heater heat exchanger into a high-temperature heat source and absorbing heat therefrom.

Conventional Stirling engines (for example, Patent Documents 1 to 3) are structured such that a heater heat exchanger is directly connected to an expansion space and a regenerator, and the heater heat exchanger and the engine (including the expansion space) are arranged in proximity to each other.

PRIOR ART DOCUMENT

Patent Document

Patent Document 1: JP-A-7-259646

Patent Document 2: JP-A-10-213012

Patent Document 3: Japanese Patent No. 5533713

SUMMARY OF INVENTION

Technical Problem

In the conventional Stirling engines, there is a problem that the degree of freedom of installation of the heater heat exchanger is small, and it is difficult to install the engine in accordance with various high temperature heat sources. For example, according to Patent Document 1, since the heater heat exchanger is arranged in the piston sliding direction (on the cylinder axis) of the engine, if the pipe for the high-temperature heat source gas is installed just beside the engine, the heater heat exchanger cannot be inserted into the heat source pipe.

The present invention has been made in view of the above problem. An object of the present invention is to provide a Stirling engine having a high degree of freedom in installation of a heater heat exchanger.

Solution to Problem

In order to solve the above problem, a Stirling engine of the present invention is a Stirling engine including an engine unit, a heater heat exchanger, a regenerator, and a cooler heat exchanger. An engine main body including at least the engine unit and the cooler heat exchanger and a heater structure including at least the heater heat exchanger are separately structured. The engine main body and the heater structure are connected via a coupling pipe portion.

According to the above configuration, the positional relationship between the engine main body and the heater structure can be easily changed by altering the shape of the coupling pipe portion (for example, by replacing the coupling pipe portion). As a result, the degree of freedom in installation of the heater heat exchanger is increased, so that the heater heat exchanger can be easily installed in a wide variety of high temperature heat sources.

In the Stirling engine, the regenerator and the cooler heat exchanger may be arranged behind a cylinder, and an upper end position of the regenerator may be above an upper end position of the cylinder.

According to the above configuration, setting the upper end position of the regenerator above the upper end position of the cylinder makes it easy to secure the arrangement space of the coupling pipe portion among the regenerator, the cylinder, and the heater heat exchanger.

The Stirling engine may be a double-acting engine in which a plurality of cylinders is arranged linearly with respect to a crankshaft of the engine unit.

Further, in the Stirling engine, in the heater heat exchanger, the heater thin tube group for a plurality of cylinders may be arranged in an annular shape.

According to the above configuration, the compact arrangement of the heater thin tube group can be realized by annularly arranging the heater thin tube group for the plurality of cylinders in the heater heat exchanger.

The Stirling engine may be arranged such that a longitudinal direction of the heater heat exchanger intersects a sliding direction of a piston in the cylinder.

The Stirling engine may include a first support member that holds the heater structure.

The Stirling engine may include a second support member that holds the regenerator.

The Stirling engine may include an on-off valve on a working fluid path connecting a low-temperature chamber of the cylinder and the cooler heat exchanger, and the working fluid path may be partially closed by the on-off valve during stoppage of the engine.

According to the above configuration, the stop control of the engine can be safely performed using an inexpensive valve such as a butterfly valve. In addition, since the on-off valve partially closes the working fluid path, it is possible to prevent a load (compression pressure) applied to the closed path from becoming too large, and avoid occurrence of damage to the components and the like.

The Stirling engine may include a bypass path that connects low-temperature chambers of cylinders with a phase shift of 180°, and a communication valve provided on the bypass path, and the communication valve may be closed to close the bypass path during operation of the engine, and the communication valve may be opened to conduct the bypass path during stoppage of the engine.

According to the above configuration, since the low-temperature chambers of the cylinders with a phase shift of 180° communicate with each other, it is possible to promptly stop the engine without applying an overload to the components or the like when the engine is to be stopped.

In addition, the Stirling engine can be configured such that the engine output is adjustable by controlling the on-off valve or the communication valve to an arbitrary opening degree during operation of the engine.

According to the above configuration, since the engine output is adjustable, when the temperature of the high-temperature heat source is excessively increased, for example, the engine output can be reduced to protect the components of the engine.

The Stirling engine may include a starter motor for starting the engine, start the starter motor in a state where the communication valve is opened at a time of starting the engine, and close the communication valve after starting the engine to stop the starter motor.

According to the above configuration, the engine load is reduced by opening the communication valve at the time of starting the engine, so that a small starter motor can be used.

In the Stirling engine, the regenerator may be included in the engine main body.

According to the above configuration, since both the regenerator and the cooler heat exchanger have a cylindrical similar shape, the regenerator is included in the engine main body, and the regenerator and the cooler heat exchanger are connected to each other in a constant manner, which is advantageous for downsizing the Stirling engine.

In the Stirling engine, each of the coupling pipes configuring the coupling pipe portion may be configured such that a heat storage is provided in the coupling pipe wall over the entire pipeline.

According to the above configuration, the connection pipe can have the same function as the regenerator by the heat storage action of the heat storage, so that the output of the Stirling engine can be improved by effectively using the heat.

In the Stirling engine, the heat storage may have a cavity portion in the center.

According to the above configuration, the cavity portion serves as a passage for the working fluid, so that it is possible to restrain an increase in pressure loss due to the heat storage in the coupling pipe.

In the Stirling engine, the coupling pipe portion may be attachable to and detachable from the engine main body and the heater structure, and have a metal O-ring arranged on a sealing surface between the coupling pipe portion and a member to be connected.

According to the above configuration, since the coupling pipe portion is attachable to and detachable from the engine main body and the heater structure, the positional relationship between the engine main body and the heater structure can be easily changed, and the use of the metal O-ring enables sealing at a place requiring resistance to high temperatures.

Advantageous Effects of Invention

In the Stirling engine of the present invention, the engine main body and the heater structure have separate structures, and the engine main body and the heater structure are connected to each other via the coupling pipe portion, so that the degree of freedom in installation of the heater heat exchanger is increased, and the heater heat exchanger can be easily installed in a wide variety of high temperature heat sources.

DESCRIPTION OF EMBODIMENTS

First Embodiment

Figure 1:
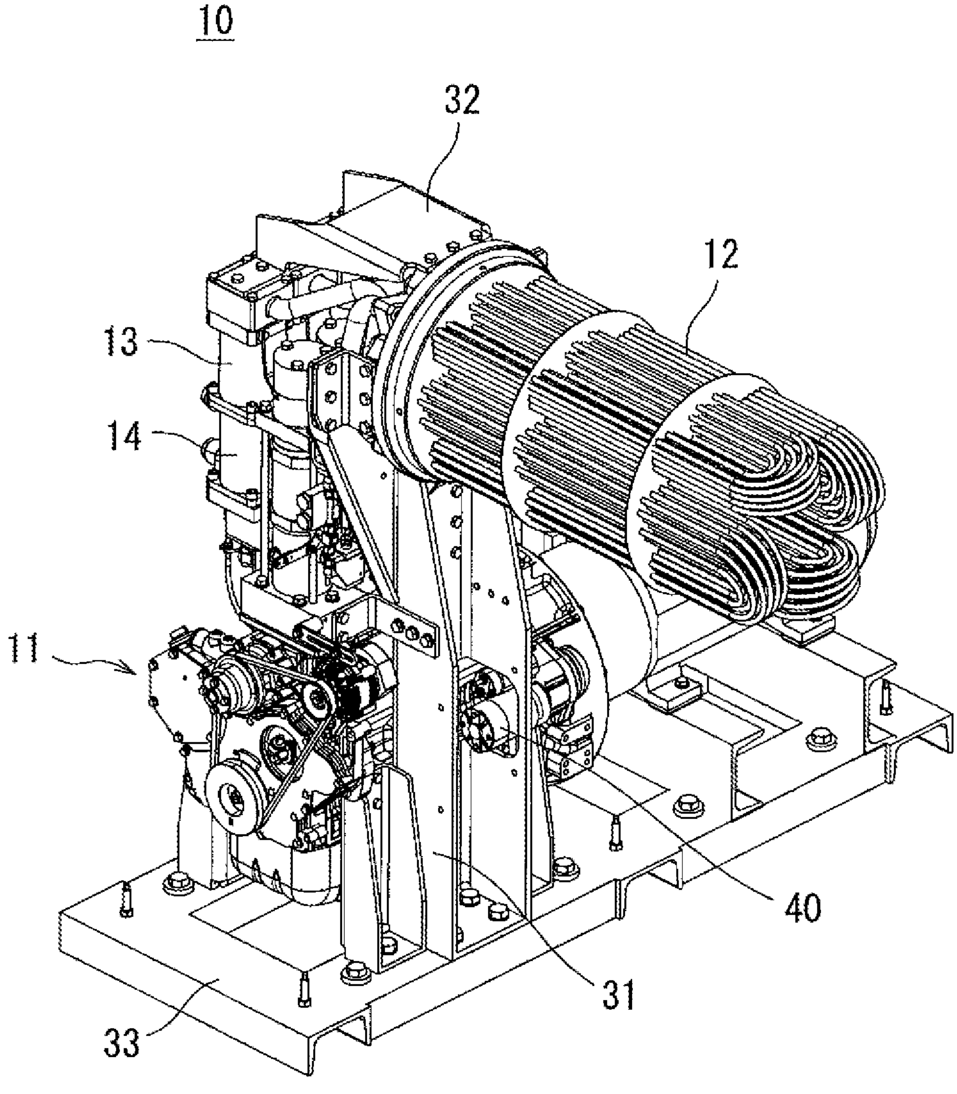
FIG. 1 is a perspective view of an embodiment of the present invention, which illustrates an outer appearance of a Stirling engine.
Figure 2:
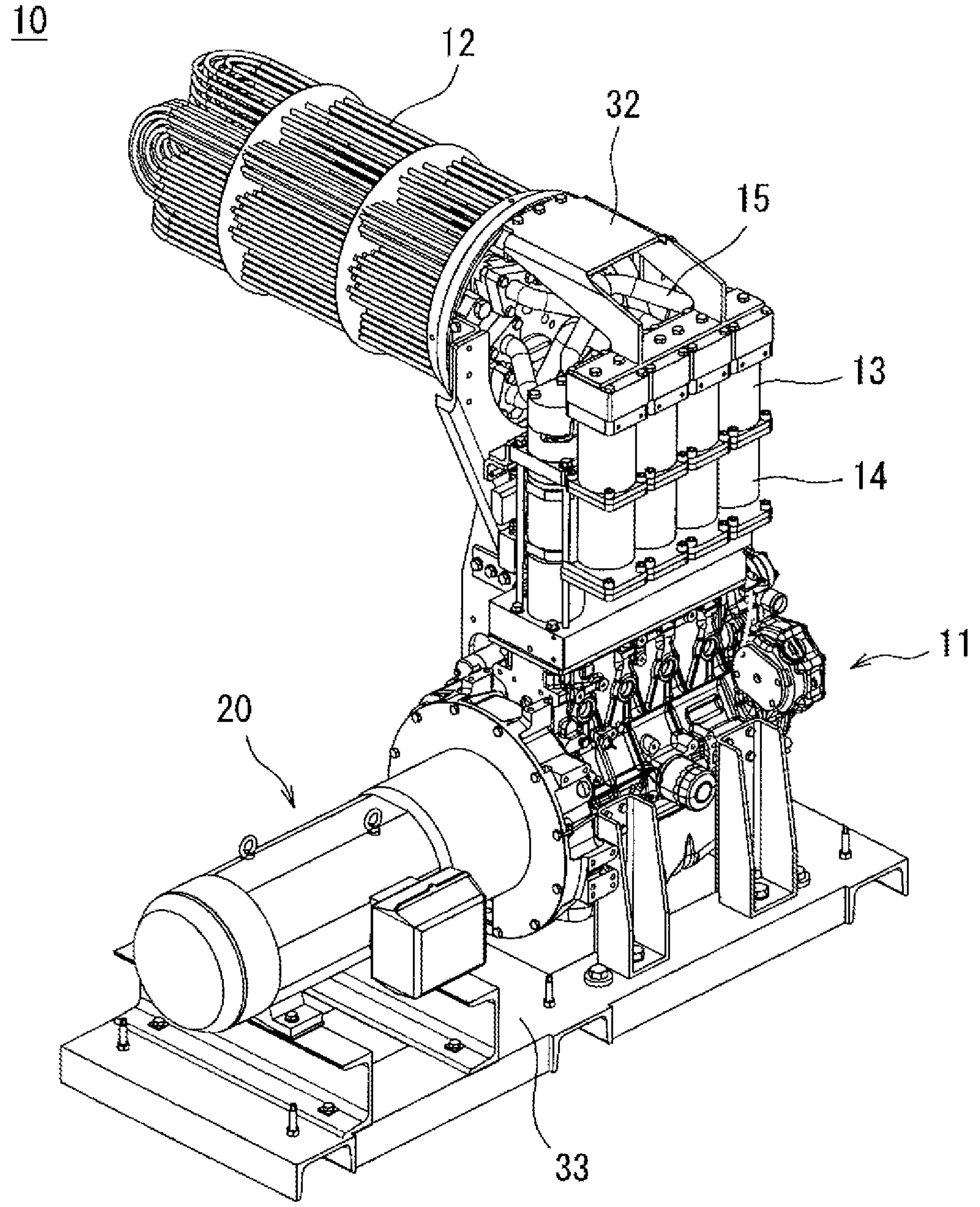
FIG. 2 is a perspective view of the Stirling engine of FIG. 1 as viewed from a different direction.
Figure 3:
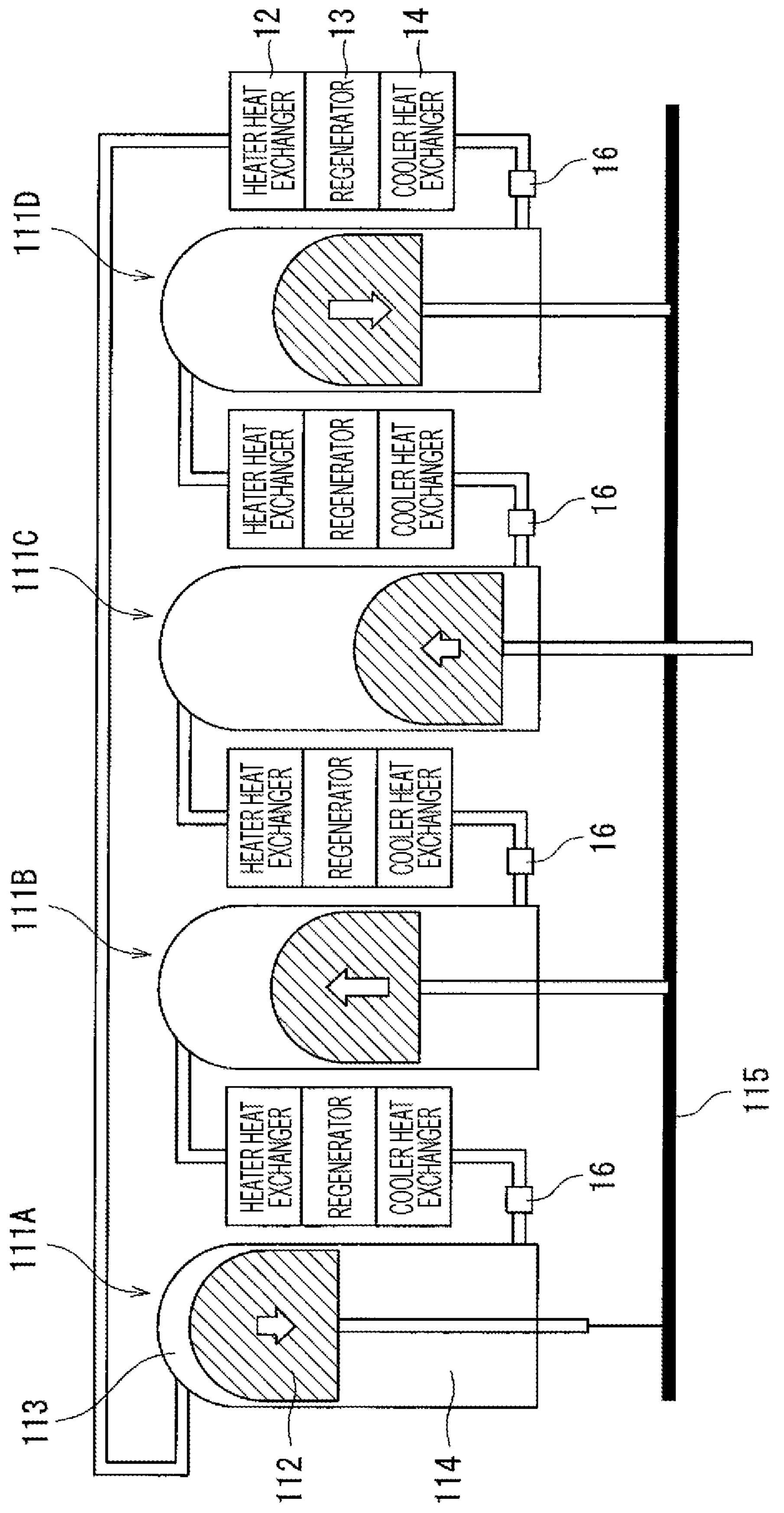
FIG. 3 is a schematic diagram illustrating a schematic configuration of the Stirling engine.

Hereinafter, embodiments of the present invention will be described in detail with reference to the drawings. FIGS. 1 and 2 are perspective views illustrating an outer appearance of a Stirling engine 10 according to a first embodiment. FIG. 3 is a schematic diagram illustrating a schematic configuration of the Stirling engine 10.

As illustrated in FIGS. 1 and 2, the Stirling engine 10 includes an engine unit 11, a heater heat exchanger 12, a regenerator 13, a cooler heat exchanger 14, and a coupling pipe portion 15. In addition, in the Stirling engine 10 illustrated in FIGS. 1 and 2, a generator 20 is connected to a crankshaft 115 (see FIG. 3) of the engine unit 11, and the generator 20 can generate power by driving the Stirling engine 10.

In the Stirling engine 10, the heater heat exchanger 12 is inserted into a high-temperature heat source (for example, a high-temperature pipe through which a high-temperature fluid flows), and the working fluid is heated in the heater heat exchanger 12. In the cooler heat exchanger 14, the working fluid is cooled by cooling water (a cooling water supply unit is not illustrated). The Stirling engine 10 is designed to drive the engine unit 11 by the movement of the working fluid thus heated/cooled. Although the engine unit 11 may be a single-cylinder type engine or a multi-cylinder type engine, the four-cylinder type engine unit 11 is exemplified in the first embodiment.

As illustrated in FIG. 3, the engine unit 11 includes four cylinders 111A to 111D (simply referred to as cylinders 111 unless otherwise distinguished). Here, four cylinders arranged linearly with respect to the crankshaft 115 are designated as the cylinders 111A to 111D according to the arrangement order. Each cylinder 111 includes a piston 112, a high-temperature chamber 113 on one side (upper side in FIG. 3) with respect to a sliding direction (up-down direction in FIG. 3) of the piston 112, and a low-temperature chamber 114 on the other side (lower side in FIG. 3). The high-temperature chamber 113 is connected to the heater heat exchanger 12, and the low-temperature chamber 114 is connected to the cooler heat exchanger 14. The heater heat exchanger 12 and the cooler heat exchanger 14 are connected with the regenerator 13 interposed therebetween. The regenerator 13 serves as a heat storage means between the heater heat exchanger 12 and the cooler heat exchanger 14, and stores heat from the working fluid when the working fluid moves from the heater heat exchanger 12 to the cooler heat exchanger 14 and causes the working fluid to recover the heat to the heater heat exchanger 12 in the opposite flow, thereby effectively utilizing the heat. The Stirling engine 10 illustrated in FIG. 3 is a four-cylinder double-acting engine, and the heater heat exchanger 12 and the cooler heat exchanger 14 connected with the same regenerator 13 interposed therebetween are connected to different cylinders 111.

The operation of the Stirling engine 10 is established by repeating a cycle in which the pistons 112 in the cylinders 111 sequentially take a first position (a top dead center position: the cylinder 111A in FIG. 3), a second position (a position at which the crankshaft 115 is rotated by 90° from the top dead center position while the piston 112 moves downward: the cylinder 111D in FIG. 3), a third position (a bottom dead center position: the cylinder 111C in FIG. 3), and a fourth position (a position at which the crankshaft 115 is rotated 90° from the bottom dead center position while the piston 112 moves upward: the cylinder 111B in FIG. 3).

The Stirling engine 10 according to the first embodiment is structurally characterized in that an engine main body E (see FIG. 4) including at least the engine unit 11 and the cooler heat exchanger 14 and a heater structure H (see FIG. 4) including at least the heater heat exchanger 12 are formed as separate structures, and are connected together via the coupling pipe portion 15. The regenerator 13 may be included in the engine main body E or may be included in the heater structure H. In the first embodiment, the regenerator 13 is included in the engine main body E as an example. In this case, the coupling pipe portion 15 includes a plurality of coupling pipes connecting the heater heat exchanger 12 and the regenerator 13 and a plurality of coupling pipes connecting the heater heat exchanger 12 and the high-temperature chambers 113 of the cylinders 111.

If the regenerator 13 is included in the heater heat exchanger 12, the coupling pipe portion 15 includes a plurality of coupling pipes connecting the regenerator 13 and the cooler heat exchanger 14 and a plurality of coupling pipes connecting the heater heat exchanger 12 and the high-temperature chambers 113 of the cylinders 111. However, since both the regenerator 13 and the cooler heat exchanger 14 have similar cylindrical shapes, integrally connecting them is advantageous to downsize the Stirling engine 10, and the regenerator 13 is preferably included in the engine main body E.

As described above, in the Stirling engine 10 in which the engine main body E and the heater structure H are connected via the coupling pipe portion 15, the positional relationship between the engine main body E and the heater structure H can be easily changed by changing the shape of the coupling pipe portion 15 (for example, by replacing the coupling pipe portion 15). That is, the heater heat exchanger 12 can be easily installed in a wide variety of high-temperature heat sources.

Figure 4:
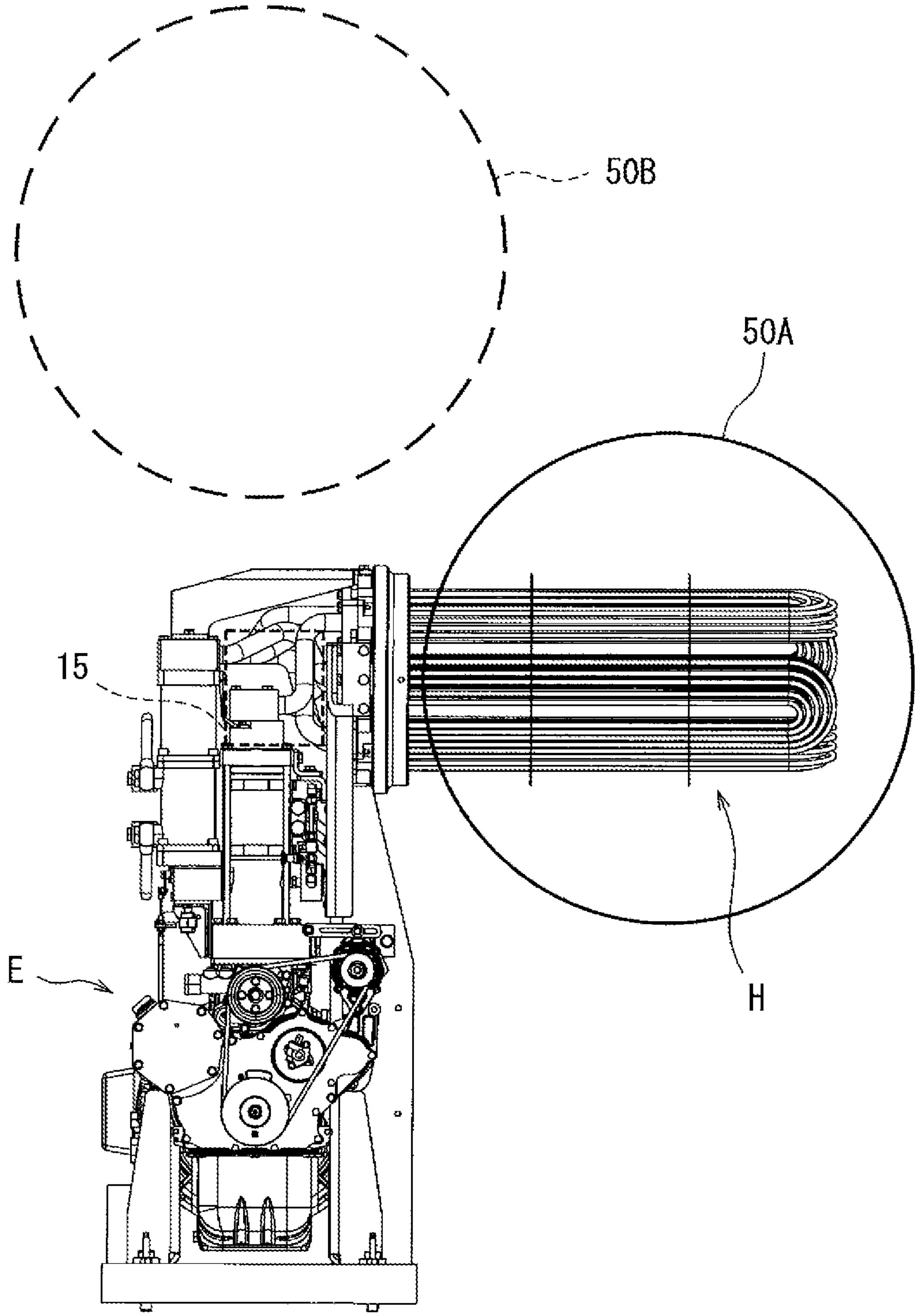
FIG. 4 is an explanatory diagram illustrating an example of a positional relationship between the Stirling engine and a high-temperature heat source.

For example, in the example illustrated in FIG. 4, the heater structure H is arranged so as to extend laterally from the engine main body E. In a case where the high-temperature heat source in which the heater heat exchanger 12 is to be arranged is a high-temperature pipe 50A present on the side of the engine main body E, the heater heat exchanger 12 can be easily installed in the high-temperature heat source. However, in the case where the high-temperature heat source in which the heater heat exchanger 12 is to be arranged is a high-temperature pipe 50B existing above the engine main body E, the heater structure H preferably extends upward rather than laterally from the engine main body E. In the Stirling engine 10 according to the first embodiment, the heater structure H can be easily arranged to extend upward from the engine main body E by changing the shape of the coupling pipe portion 15.

In the Stirling engine 10, if the engine main body E and the heater structure H are supported only by the coupling pipe portion 15, there is a problem of strength. If the support strength in the Stirling engine 10 is weak, the vibrations of the plurality of cylinders 111 cannot be restrained, and the vibration of the entire engine increases. In addition, for example, as illustrated in FIGS. 1 and 2, when the heater structure H has a lateral structure extending laterally from the engine main body E (in other words, a structure in which the longitudinal direction of the heater heat exchanger 12 is orthogonal to the sliding direction of the piston 112 in the cylinder 111), an unbalanced load may be generated on the coupling pipe portion 15 due to the weight of the heater structure H.

Therefore, the Stirling engine 10 according to the present embodiment preferably includes support members (for example, frames 31 and 32 in FIG. 1) that hold the engine main body E and the heater structure H. The frame 31 supports the heater heat exchanger 12 horizontally connected to the engine main body E, from an engine base 33 and the cylinder block of the engine unit 11. The frame 31 corresponds to the first support member described in the claims. The frame 32 connects the heater heat exchanger 12 and the regenerators 13, and also connects the regenerators 13 to each other and supports the regenerators 13. The frame 32 corresponds to the second support member described in the claims. These support members can restrain the vibration of the Stirling engine 10. In addition, it is possible to adopt a heater lateral structure that cannot be realized by a conventional structure.

Second Embodiment

In a second embodiment, it is assumed that a Stirling engine 10 is a four-cylinder double-acting engine. That is, as illustrated in FIG. 3, in the Stirling engine 10, pistons 112 in four cylinders 111A to 111D are driven with a phase shift of 90° (specifically, the phases of the pistons 112 are delayed by 90° in the order of the cylinders 111A to 111D.). When a reference cylinder (for example, the cylinder 111A) is defined as a first cylinder and the other cylinders are defined as second to fourth cylinders in order of phase delay from the first cylinder, in the example of FIG. 3, the cylinder 111B is the second cylinder, the cylinder 111C is the third cylinder, and the cylinder 111D is the fourth cylinder.

In the case of a cylinder double-acting engine in which four cylinders are arranged linearly with respect to the crankshaft 115, a couple of forces is generated between two cylinders with a phase shift of 180°, and the couple of forces causes engine vibration or applies a load (bending stress) to the crankshaft. In the example of FIG. 3, the four cylinders 111 are arranged in order from the first cylinder to the fourth cylinder. A couple of forces is generated between the first cylinder and the third cylinder and between the second cylinder and the fourth cylinder. In addition, as illustrated in FIG. 5, in a case where the force given to the crankshaft 115 by the cylinder is F and the pitch between two adjacent cylinders is L, the maximum couple of forces N (for example, the couple of forces between the first cylinder and the third cylinder) acting on the crankshaft 115 is N=2 FL.

Figure 6:
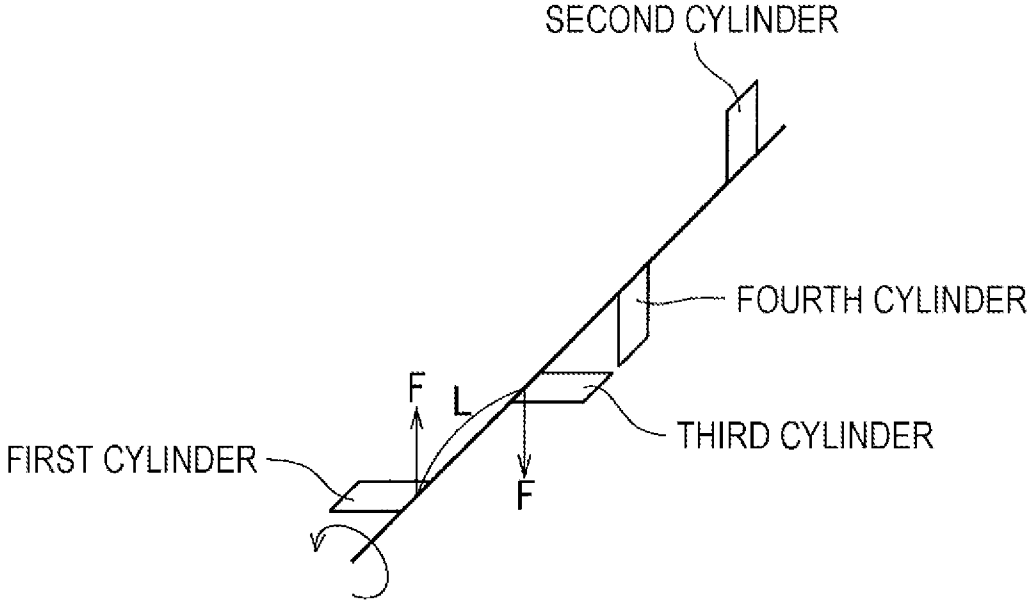
FIG. 6 is an explanatory diagram illustrating a preferred example of a couple of forces acting on the crankshaft.

On the other hand, in the second embodiment, the couple of forces generated in the crankshaft 115 is restrained (minimized) by adjusting the arrangement order of the cylinders. Specifically, the cylinders with a phase shift of 180° are arranged close to (adjacent to) each other. For example, as illustrated in FIG. 6, when the first cylinder and the third cylinder are arranged adjacent to each other and the second cylinder and the fourth cylinder are arranged adjacent to each other, the maximum couple of forces N (for example, the couple of forces between the first cylinder and the third cylinder) acting on the crankshaft 115 is N=FL. Although the first cylinder, the third cylinder, the fourth cylinder, and the second cylinder are arranged in this order in FIG. 6, the order of the fourth cylinder and the second cylinder may be switched.

In the four-cylinder double-acting engine, the heater heat exchanger 12, the regenerator 13, and the cooler heat exchanger 14 as a set are connected between cylinders with a phase shift of 90°. Taking FIG. 3 as an example, a set of the heater heat exchanger 12, the regenerator 13, and the cooler heat exchanger 14 is connected between the cylinder 111A that is the first cylinder and the cylinder 111B that is the second cylinder. Specifically, the cooler heat exchanger 14 is connected to the low-temperature chamber 114 of the cylinder 111A of which phase is advanced, and the heater heat exchanger 12 is connected to the high-temperature chamber 113 of the cylinder 111B of which phase is delayed. Similar connection relationships are present between the cylinder 111B that is the second cylinder and the cylinder 111C that is the third cylinder, between the cylinder 111C that is the third cylinder and the cylinder 111D that is the fourth cylinder, and between the cylinder 111D that is the fourth cylinder and the cylinder 111A that is the first cylinder.

Figure 5:
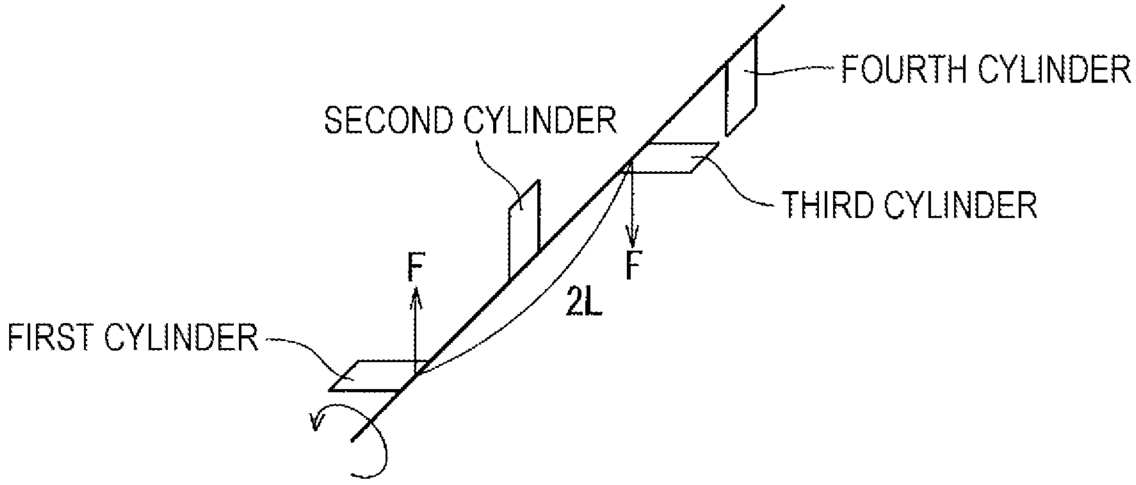
FIG. 5 is an explanatory diagram illustrating an example of a couple of forces acting on a crankshaft.
Figure 7:
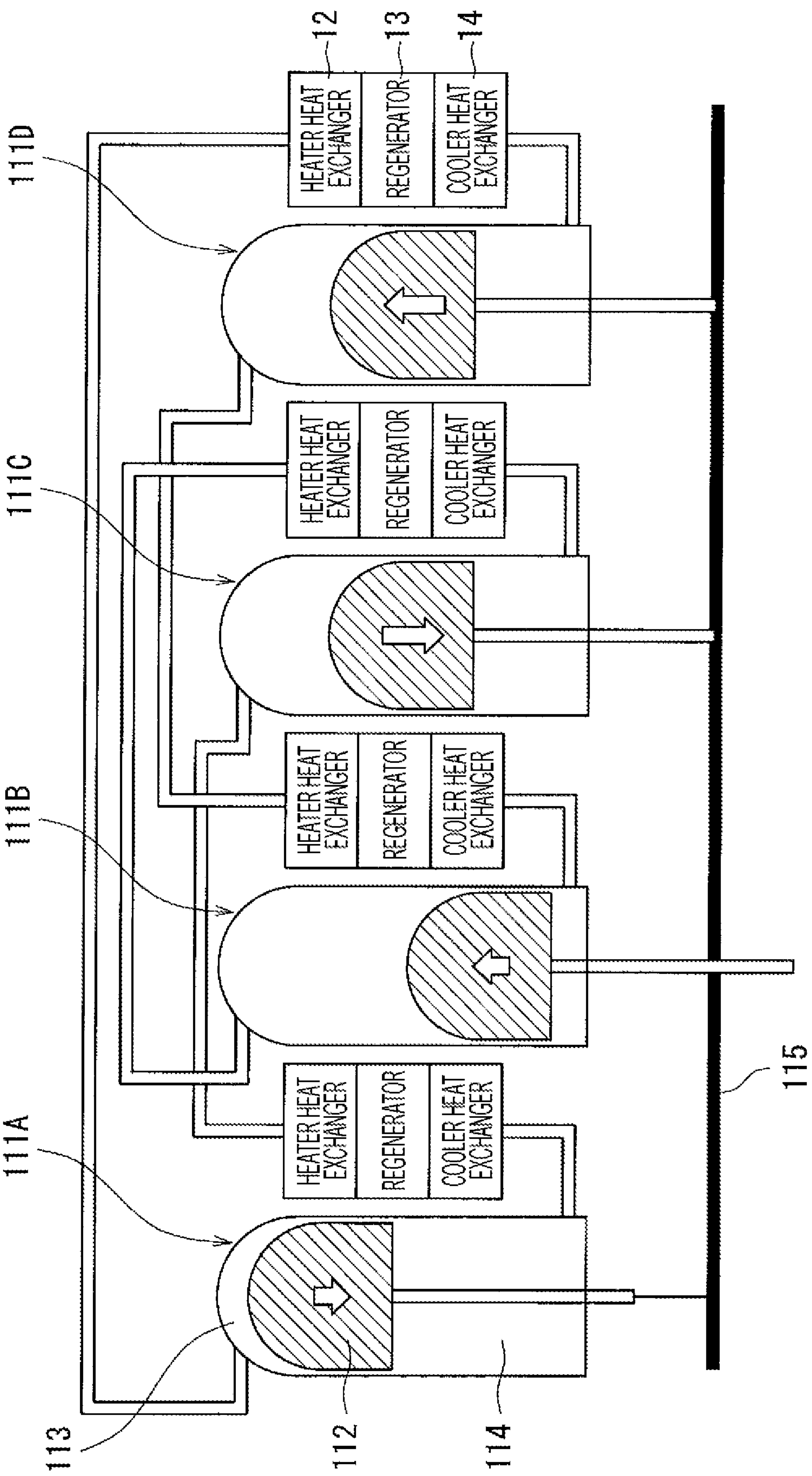
FIG. 7 is a schematic diagram illustrating a schematic configuration of the Stirling engine.

FIG. 3 illustrates the cylinder arrangement with respect to the crankshaft 115 in the order of the first to fourth cylinders (the arrangement order corresponding to FIG. 5). On the other hand, if the cylinder arrangement is the order of the first cylinder, the third cylinder, the fourth cylinder, and the second cylinder (the arrangement order corresponding to FIG. 6) in order to reduce the load on the crankshaft 115, the connection of the heater heat exchanger 12, the regenerator 13, and the cooler heat exchanger 14 between the cylinders is schematically as illustrated in FIG. 7.

Figure 10:
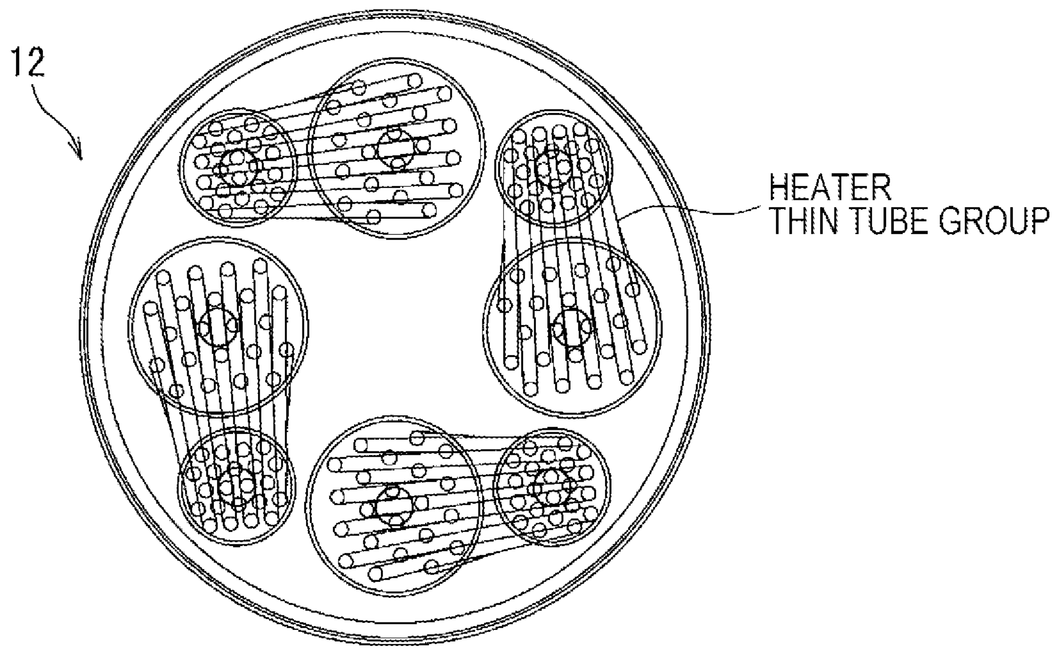
FIG. 10 is a plan view illustrating an arrangement example of a heater thin tube group in the heater heat exchanger.

The heater heat exchanger 12 is configured with a heater thin tube group so that efficient heat exchange can be performed in a state of being inserted into a high-temperature heat source. In a conventional structure in which the engine main body E and the heater structure H have an integrated structure and the heater heat exchanger 12 is directly connected (without the coupling pipe portion 15) to both the high-temperature chamber 113 of the engine unit 11 and the regenerator 13, it is difficult to obtain a connection structure as illustrated in FIG. 7. That is, in the heater heat exchanger 12, compact arrangement of the heater thin tube group for four cylinders (for example, regular arrangement of the heater thin tube groups as illustrated in FIG. 10) becomes impossible.

Figure 8:
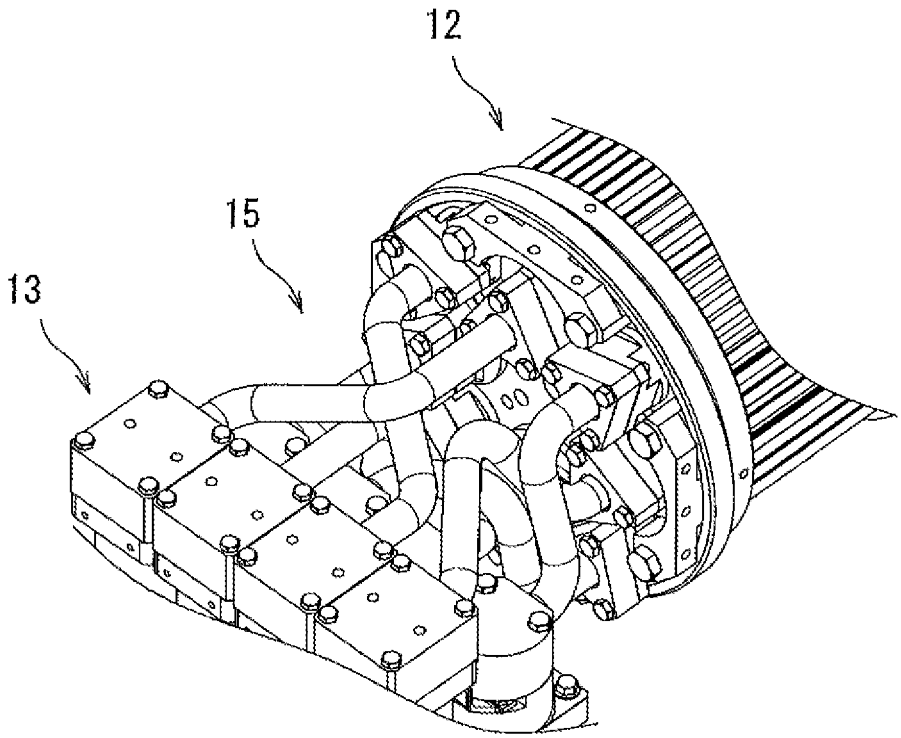
FIG. 8 is an enlarged perspective view of a coupling pipe portion in the Stirling engine.

On the other hand, in the Stirling engine 10 according to the second embodiment, as in the first embodiment, the engine main body E and the heater structure H are separate structures and are connected via the coupling pipe portion 15. Therefore, as illustrated in FIG. 8, the plurality of coupling pipes in the coupling pipe portion 15 enables the connection between the heater heat exchanger 12 and the regenerator 13 and the connection between the heater heat exchanger 12 and the high-temperature chamber 113 of each cylinder 111 with a high degree of freedom. As a result, the heater heat exchanger 12 can be compactly arranged in the heater thin tube group for four cylinders, regardless of the connection relationship with the regenerator 13 and the cylinder 111.

Figure 9:
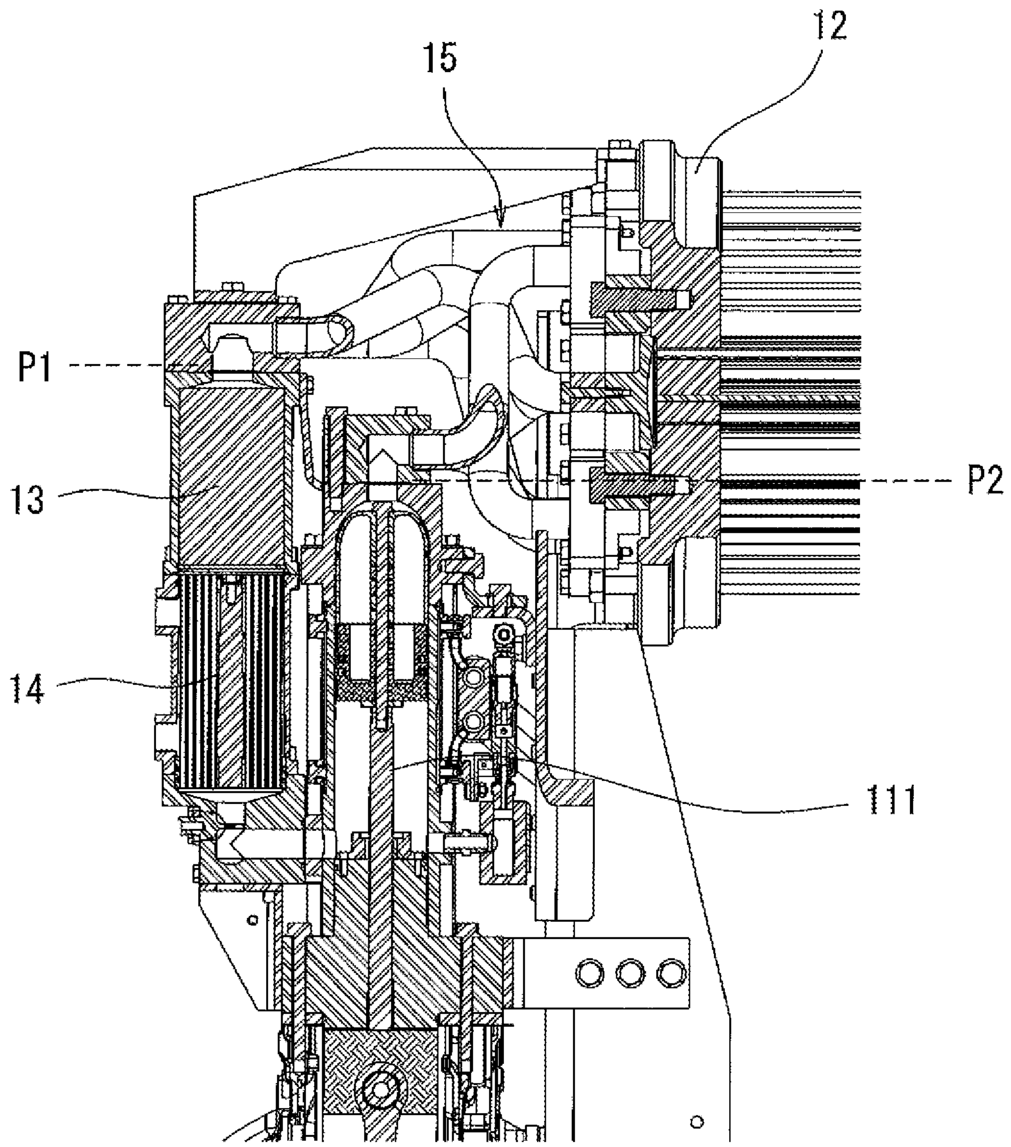
FIG. 9 is a diagram illustrating an arrangement relationship among a regenerator, a cooler heat exchanger, and cylinders in the Stirling engine.

More specifically, as illustrated in FIG. 9, it is preferable that the regenerator 13 and the cooler heat exchanger 14 are vertically placed close to each other at the rear of the cylinder 111, and an upper end position P1 of the regenerator 13 is above an upper end position P2 of the cylinder 111. This makes it easy to secure an arrangement space of the coupling pipe portion 15 among the regenerator 13, the cylinder 111, and the heater heat exchanger 12. Further, in the heater heat exchanger 12, the heater thin tube group for four cylinders is preferably arranged in an annular shape, as illustrated in FIG. 10. This realizes compact arrangement of the heater thin tube group in the heater heat exchanger 12.

Figure 11:
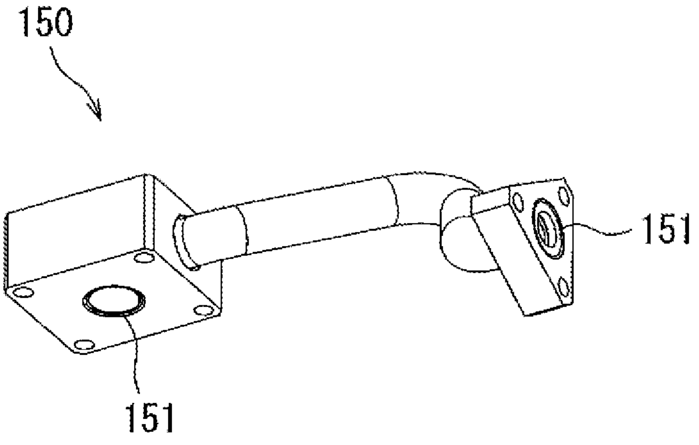
FIG. 11 is a perspective view illustrating an outer appearance example of a coupling pipe.

The coupling pipe portion 15 can be configured such that a coupling pipe 150 as illustrated in FIG. 11 is individually connected (attachable to and detachable from the engine main body E and the heater structure H) between the heater heat exchanger 12 and the regenerator 13 or between the heater heat exchanger 12 and the cylinder 111. The coupling pipe 150 is preferably configured to obtain airtightness by arranging a metal O-ring 151 on a sealing surface between the coupling pipe 150 and a member (the heater heat exchanger 12, the regenerator 13, or the cylinder 111) to be connected. As the metal O-ring 151, a metallic hollow O-ring gasket having resistance to high temperature or the like can be used.

Third Embodiment

A Stirling engine 10 is a passive engine and basically continues to operate as long as heat is supplied from a high-temperature heat source (and stops operating when there is no supply of heat). However, it is also conceivable that the operation of the engine needs to be stopped in an emergency or the like. In a third embodiment, a preferred example of a configuration for stopping the Stirling engine 10 will be described.

The Stirling engine 10 can stop by stopping the movement of a working fluid. Therefore, the Stirling engine 10 according to the third embodiment can be configured such that an on-off valve 16 (see FIG. 1) is provided in a low-temperature portion path of the working fluid (a working fluid path connecting a low-temperature chamber 114 of a cylinder 111 and a cooler heat exchanger 14), the on-off valve 16 is opened during the operation of the engine, and the engine is stopped by closing the on-off valve 16. In principle, the path provided with the on-off valve 16 is not particularly limited, and the on-off valve can be provided in a high-temperature portion path (a working fluid path connecting a high-temperature chamber 113 of the cylinder 111 and a heater heat exchanger 12). However, in the Stirling engine 10, the high-temperature portion path configures a coupling pipe portion 15, so that the high-temperature portion path is unsuitable for arrangement of the on-off valve 16, and the on-off valve 16 is preferably provided on the low-temperature portion path.

The type of the on-off valve 16 used is not particularly limited, and for example, an inexpensive valve such as a butterfly valve can be used. In this case, if the on-off valve 16 completely closes the path, a load (compression pressure) applied to the closed path becomes too large, and damage may occur in components and the like. Therefore, it is preferable that the on-off valve 16 does not completely close the path, and is a perforated valve that can allow the working fluid to pass to some extent (partially close the path). That is, even if the on-off valve 16 does not completely close the path, the engine can be stopped only by decreasing the flow path area to reduce the movement amount of the working fluid. More specifically, the path closing area of the on-off valve 16 is set to a maximum area in which the engine is not damaged under the compression pressure generated by the closing the valve and in which the engine can be reliably stopped (engine output≤mechanical loss).

The on-off valve 16 may be configured to adjust the flow path area using a rotary solenoid or the like. In this case, it is possible to perform control to gradually reduce the flow path area, and it is possible to avoid a sudden stop of the engine and reduce a load or the like applied to pistons 112 when the engine is stopped.

Figure 12:
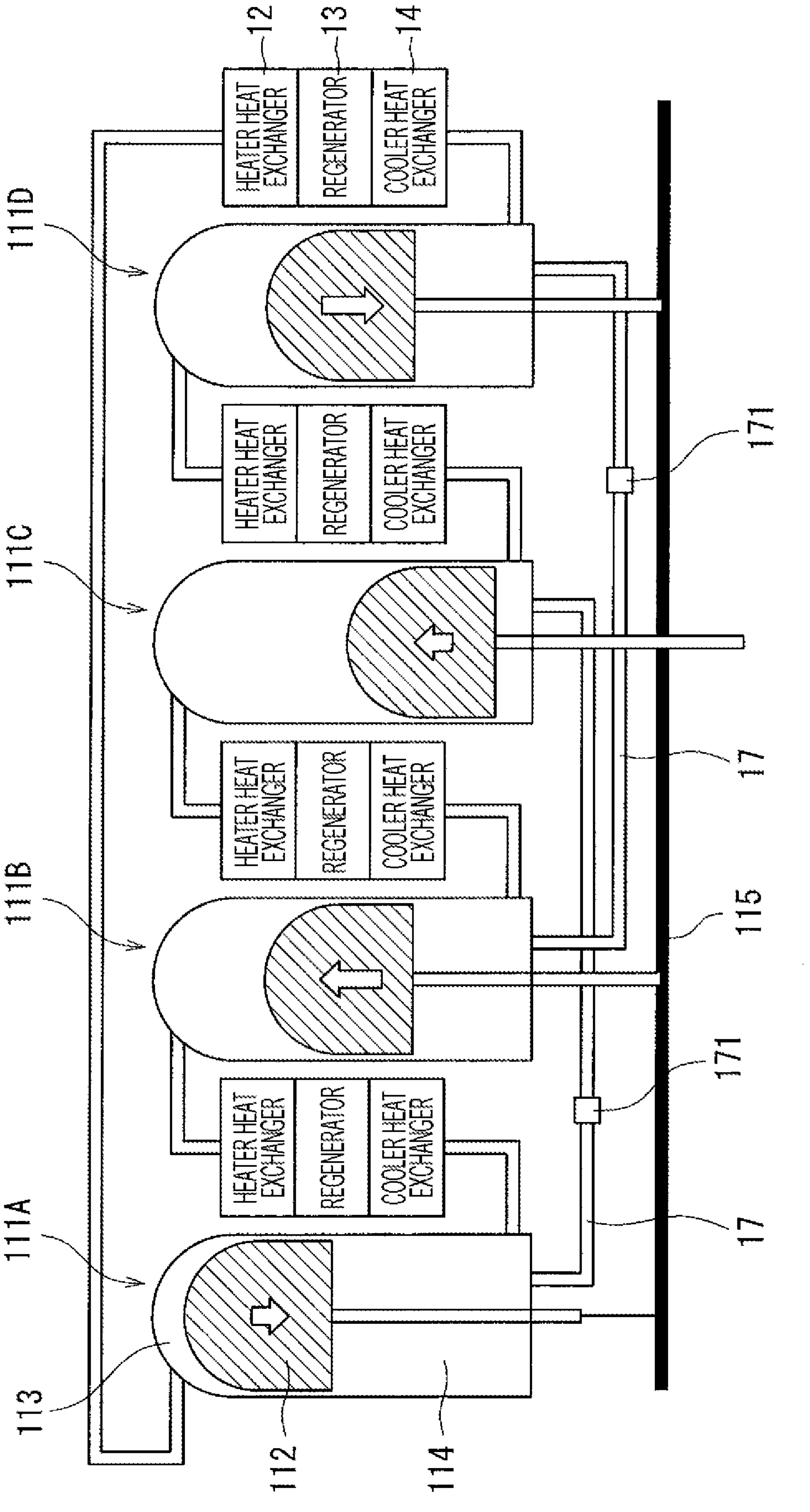
FIG. 12 is a schematic diagram illustrating a schematic configuration of the Stirling engine.

As a modification of the Stirling engine 10 according to the third embodiment, a configuration illustrated in FIG. 12 is also conceivable. A Stirling engine 10 illustrated in FIG. 12 is configured such that low-temperature chambers 114 of cylinders 111 with phase shifts of 180° are connected to each other by bypass paths 17, and communication valves 171 are provided in the bypass paths 17. In the example of FIG. 12, a cylinder 111A and a cylinder 111C are connected by the bypass path 17, and a cylinder 111B and a cylinder 111D are connected by the bypass path 17.

In the Stirling engine 10 of FIG. 12, the communication valves 171 are closed during the operation of the engine, and the communication valves 171 are opened to make the bypass paths 17 conductive (provide communication between the low-temperature chambers 114 of the cylinders 111 with a phase shift of 180°), whereby the engine can be stopped. In this configuration, it is possible to promptly stop the engine without applying an overload to components or the like.

When the engine stop configuration in FIG. 12 is applied to the Stirling engine 10 employing the cylinder arrangement illustrated in FIG. 6, the cylinders with a phase shift of 180° are arranged adjacent to each other, so that the bypass paths 17 can be shortened. As a result, it is possible to restrain generation of an unnecessary volume and a cost increase due to the bypass paths 17. In addition, it is also possible to reduce the horsepower loss at the time of startup in a case where the bypass paths 17 are long.

In addition, in the Stirling engine 10 according to the third embodiment, the opening degree of the on-off valves 16 and the communication valves 171 can be adjusted, so that the Stirling engine 10 can be used for output control of the engine. For example, if the temperature of the high-temperature heat source excessively rises, the on-off valves 16 are somewhat closed, or the communication valves 171 are somewhat opened, so that it is possible to reduce the engine output and protect the components of the engine.

Fourth Embodiment

In a fourth embodiment, a preferred example of a configuration for startup control of a Stirling engine 10 will be described.

The Stirling engine 10 requires a starter motor 40 (see FIG. 1) at its startup. As a matter of course, the larger the engine load (pressure loss) at the startup of the Stirling engine 10, the larger the size of the starter motor 40 is required.

On the other hand, the Stirling engine 10 according to the fourth embodiment is assumed to have the configuration illustrated in FIG. 12, and is characterized by reducing the engine load at the time of startup using communication valves 171. That is, in the Stirling engine 10 according to the fourth embodiment, the starter motor 40 is started with the communication valves 171 opened at the time of startup. In the Stirling engine 10, since the engine load is reduced by opening the communication valves 171, the small-sized starter motor 40 can be used. Then, when the rotation speed of the engine reaches a predetermined value, the communication valves 171 are closed and the starter motor 40 is stopped, so that the operation of the engine can be maintained.

Fifth Embodiment

The Stirling engine 10 described above is characterized in that the engine main body E and the heater structure H are formed as separate structures, and they are connected via the coupling pipe portion 15. In this configuration, the coupling pipe portion 15 becomes an ineffective volume that does not contribute to the thermal cycle, which may cause a decrease in the output of the Stirling engine 10. In relation to a fifth embodiment, a preferred example for restraining a decrease in output due to the coupling pipe portion 15 will be described.

Figure 13:
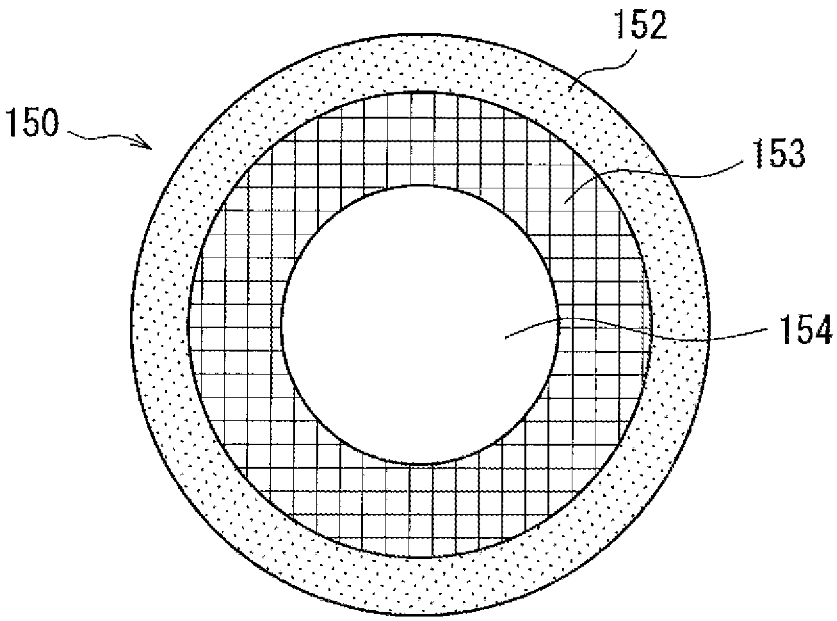
FIG. 13 is a cross-sectional view of the coupling pipe.

FIG. 13 is a cross-sectional view of a coupling pipe 150 for use in the coupling pipe portion 15. In the coupling pipe 150 illustrated in FIG. 13, a heat accumulator 153 such as a wire mesh or a metal nonwoven fabric is provided inside the coupling pipe wall 152 over the entire pipeline. In addition, the central portion of the heat accumulator 153 is preferably a cavity portion 154. The coupling pipe 150 configured in this manner can accumulate heat in the heat accumulator 153 and reduce heat dissipation to the outside when a high-temperature working fluid passes through the inside of the coupling pipe 150. In addition, since the central portion of the heat accumulator 153 is formed as the cavity portion 154, the cavity portion 154 serves as a working fluid passage, so that it is possible to restrain an increase in pressure loss due to the heat accumulator 153.

The coupling pipe 150 illustrated in FIG. 13 can have a function similar to that of a regenerator 13 by the heat accumulation action of the heat accumulator 153, so that the output of the Stirling engine 10 can be improved by effectively using the heat.

The embodiments disclosed herein are illustrative in all respects and do not provide a basis for a limited interpretation. Therefore, the technical scope of the present invention should not be construed only by the above-described embodiments, but is defined based on the description of the claims. In addition, the present invention includes all modifications within a meaning and scope equivalent to the claims.

LIST OF REFERENCE SIGNS

10 Stirling engine
11 Engine unit
111 Cylinder
112 Piston
113 High-temperature chamber
114 Low-temperature chamber
115 Crank shaft
12 Heater heat exchanger
13 Regenerator

14 Cooler heat exchanger
15 Coupling pipe portion
150 Coupling pipe
151 Metal O-ring
152 Coupling pipe wall
153 Heat accumulator
154 Cavity portion
16 On-off valve
17 Bypass path
171 Communication valve
20 Generator
31 Frame (first support member)
32 Frame (second support member)
33 Engine base
40 Starter motor
50A High-temperature pipe
50B High-temperature pipe
E Engine main body
H Heater structure

The invention claimed is:

1. A Stirling engine comprising:
an engine unit;
a heater heat exchanger configured to be inserted into a high temperature heat source;
a regenerator; and
a cooler heat exchanger,
wherein:
an engine main body including at least the engine unit and the cooler heat exchanger and a heater structure including at least the heater heat exchanger are separately structured,
the engine main body and the heater structure are connected via a coupling pipe portion; and
the coupling pipe portion is distinct from the heater structure.

2. The Stirling engine according to claim 1, wherein:
the regenerator and the cooler heat exchanger are arranged behind a cylinder, and
an upper end position of the regenerator is above an upper end position of the cylinder.

3. The Stirling engine according to claim 1, wherein the Stirling engine is a double-acting engine in which a plurality of cylinders arranged linearly with respect to a crankshaft of the engine unit is driven.

4. The Stirling engine according to claim 3, wherein, in the heater heat exchanger, a heater thin tube group for the plurality of cylinders is annularly arranged.

5. The Stirling engine according to claim 2, wherein the heater heat exchanger is arranged such that a longitudinal direction of the heater heat exchanger intersects a sliding direction of a piston in the cylinder.

6. The Stirling engine according to claim 5, further comprising a first support member configured to hold the heater structure.

7. The Stirling engine according to claim 5, further comprising a second support member configured to hold the regenerator.

8. The Stirling engine according to claim 2, further comprising:
an on-off valve on a working fluid path connecting a low-temperature chamber of the cylinder and the cooler heat exchanger, and
wherein the working fluid path is partially closed by the on-off valve during stoppage of the engine unit.

9. The Stirling engine according to claim 3, further comprising:
a bypass path that connects low-temperature chambers of two cylinders of the plurality of cylinders with a phase shift of 180° ; and
a communication valve provided on the bypass path, and
wherein the communication valve is configured to be closed to close the bypass path during operation of the engine unit, and the communication valve is configured to be opened to let the bypass path communicate during stoppage of the engine unit.

10. The Stirling engine according to claim 8, wherein engine output is adjustable by controlling the on-off valve to an arbitrary opening degree during operation of the engine unit.

11. The Stirling engine according to claim 9, wherein engine output is adjustable by controlling the communication valve to an arbitrary opening degree during operation of the engine unit.

12. The Stirling engine according to claim 9, further comprising:
a starter motor for starting the engine unit, and
wherein the starter motor is configured to be started in a state where the communication valve is opened at a time of starting the engine unit, and the communication valve is configured to be closed after starting the engine unit to stop the starter motor.

13. The Stirling engine according to claim 1, wherein:
the regenerator is included in the engine main body; and
the coupling pipe portion is distinct from the engine main body.

14. The Stirling engine according to claim 1, wherein each of a plurality of coupling pipes configuring the coupling pipe portion is provided with a heat accumulator inside of a coupling pipe wall over an entire pipeline.

15. The Stirling engine of claim 14, wherein a central portion of the heat accumulator is a hollow portion.

16. The Stirling engine according to claim 1, wherein the coupling pipe portion is attachable to and detachable from each of the engine main body and the heater structure, and has a metal O-ring arranged on a sealing surface between the coupling pipe portion and a member to be connected.

17. A Stirling engine comprising:
an engine unit;
a heater heat exchanger;
a regenerator; and
a cooler heat exchanger,
wherein:
an engine main body including at least the engine unit and the cooler heat exchanger and a heater structure including at least the heater heat exchanger are separately structured,
the engine main body and the heater structure are connected via a coupling pipe portion, and
the regenerator and the cooler heat exchanger are arranged behind a cylinder.

18. The Stirling engine according to claim 17, wherein an upper end position of the regenerator is above an upper end position of the cylinder.

19. A Stirling engine comprising:
an engine unit including a plurality of cylinders;
a bypass path that connects low-temperature chambers of two cylinders of the plurality of cylinders;
a heater heat exchanger;
a regenerator; and
a cooler heat exchanger, wherein:

an engine main body including at least the engine unit and the cooler heat exchanger and a heater structure including at least the heater heat exchanger are separately structured, and the engine main body and the heater structure are connected via a coupling pipe portion.

20. The Stirling engine according to claim 19, further comprising:

a communication valve provided on the bypass path, and wherein:

the communication valve is configured to be closed to close the bypass path during operation of the engine unit, and the communication valve is configured to be opened to let the bypass path communicate during stoppage of the engine unit, and the bypass path connects the low-temperature chambers of the two cylinders of the plurality of cylinders with a phase shift of 180°.

* * * * *